H. J. KAST.
PIPE UNION.
APPLICATION FILED JULY 25, 1914.
1,157,695.
Patented Oct. 26, 1915.
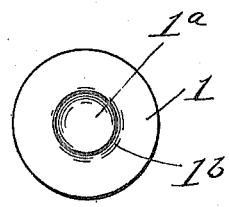
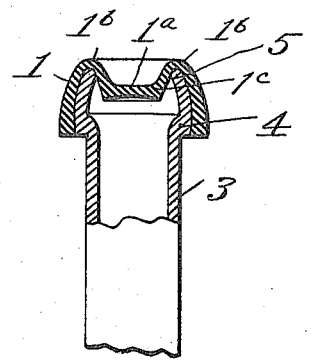
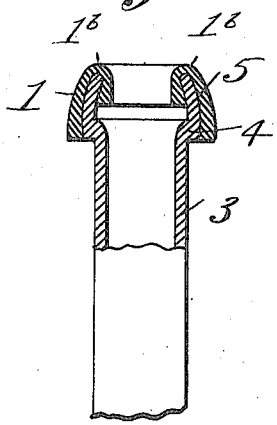
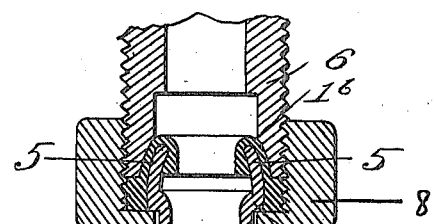

UNITED STATES PATENT OFFICE.

HENRY J. KAST, OF WATERBURY, CONNECTICUT, ASSIGNOR TO AMERICAN PIN COMPANY, OF WATERBURY, CONNECTICUT, A CORPORATION OF CONNECTICUT.

PIPE-UNION.

1,157,695.     Specification of Letters Patent.     Patented Oct. 26, 1915.

Application filed July 25, 1914. Serial No. 853,143.

*To all whom it may concern:*

Be it known that I, HENRY J. KAST, a citizen of the United States, and residing at Waterbury, county of New Haven, and State of Connecticut, have invented certain new and useful Improvements in Pipe-Unions, of which the following is a full and clear specification.

My invention relates to pipe unions and particularly to the class of pipe unions in which one pipe section is internally flared to receive the tapered end of the second pipe section. Unions of this class are usually employed for joining pipe sections which have been previously made up as separate articles of manufacture. For example, bath room fixtures such as faucets and the like, are manufactured, carried in stock and sold without the pipe sections or elbows with which they are ultimately joined, the practice being to provide corresponding engaging surfaces of standard dimensions, on the fixtures and elbows or supply pipes respectively.

The object of my invention is to improve the construction of the male member of such unions and the manufacture of said members, whereby the necessary gasket may be permanently attached to the member in the factory, thus avoiding the annoyance caused by losing the gasket and facilitating the operation of approximating the member with the corresponding female member.

In the accompanying drawings Figure 1 shows in plan the blank from which my gasket is formed. Fig. 2 shows in longitudinal section the first operation of applying the gasket to the male member of a pipe union. Fig. 3 is a similar view of a later phase of the forming of the gasket, and Fig. 4 is a longitudinal section of the assembled pipe union.

Referring more particularly to the drawings in which like numerals represent corresponding parts in all views, 1 represents a gasket of sheet lead or other suitable metal or material. As shown in Figs. 1 and 2 the gasket 1, which is formed from sheet lead or other suitable metal or material, comprises substantially a cup having its bottom $1^a$ raised toward the rim of the cup whereby a fold is formed in the wall of the cup at $1^b$. The pipe section or male member 3 is bent outwardly at 4 in known manner and then bent inwardly toward its rim 5, the diameter of the rim 5 being approximately the same as the normal diameter of the pipe section 3.

In Figs. 2, 3 and 4 I have shown the method of attaching the gasket 1 to the male member 3. The dimensions of the gasket 1 are such that when inverted and applied to the end of the male member 3, the fold $1^b$ will fit the rim 5 and the outer wall of the gasket 1 will lie on the expanded portion of the male member 3. The parts being in this relation the portion $1^a$ is punched out of the gasket 1 and a follower punch then forces the oblique wall $1^c$ outwardly against the member 3. As shown in Fig. 3, the result of this operation is to substantially aline the inner face of the wall $1^c$ with the bore of the member 3, and to press the outer face of the wall $1^c$ against the enlargement of the member 3, thereby effecting a locking engagement between the gasket 1 and the member 3.

While I have described a method for attaching to the male member a gasket formed of sheet lead, it will be understood that in one aspect my invention is not limited to such a method but covers for example a molded gasket having the functions of the gasket described herein.

In Fig. 4 are shown the relation and condition of the parts when assembled with the female member 6 (bath cock or the like). The member 6 is internally flared to receive the member 3 with its attached gasket 1. As shown, the draw nut 8 engages the shoulder 4 and, by means of an internal thread, also engages the external thread of the member 6. The nut 8 being advanced on the member 6 the member 3 and gasket 1 are forced into the member 6. In order to insure a tight seal the dimensions of the flared female section 6 and the gasket 1 are so proportioned that in the operation of approximating the parts, the gasket 1 is forced to take the shape shown, the lead of which it is composed being compacted and firmly pressed against the opposing surfaces of the member 3 and 6 and the draw-nut 8.

I claim:

1. The combination with adjacently disposed pipe sections, one of said sections being provided with an interior recess and an external shoulder and the other of said sections being exteriorly threaded, a draw nut threaded to one of said sections and engaging the shoulder on the other, and a gasket having one portion expanded into said interior recess in one section and another portion clamped between said sections and between said sections and said draw nut.

2. A fitting having a rounded head and a shoulder for coöperation with the flange on a union nut, a relatively soft metal coating permanently attached to the rounded end of the fitting, one portion of the coating adapted to form a seat for a coöperating pipe to which the fixture is adapted to be attached, and another portion of the coating adapted to be forced into the threads of the union nut upon coupling of the fixture to the coöperating pipe.

HENRY J. KAST.

Witnesses:
 JOHN M. LYNCH,
 R. A. FERRIS.